No. 856,018. PATENTED JUNE 4, 1907.
R. BELDEN.
POWER SHOVEL.
APPLICATION FILED NOV. 20, 1906.
3 SHEETS—SHEET 1.
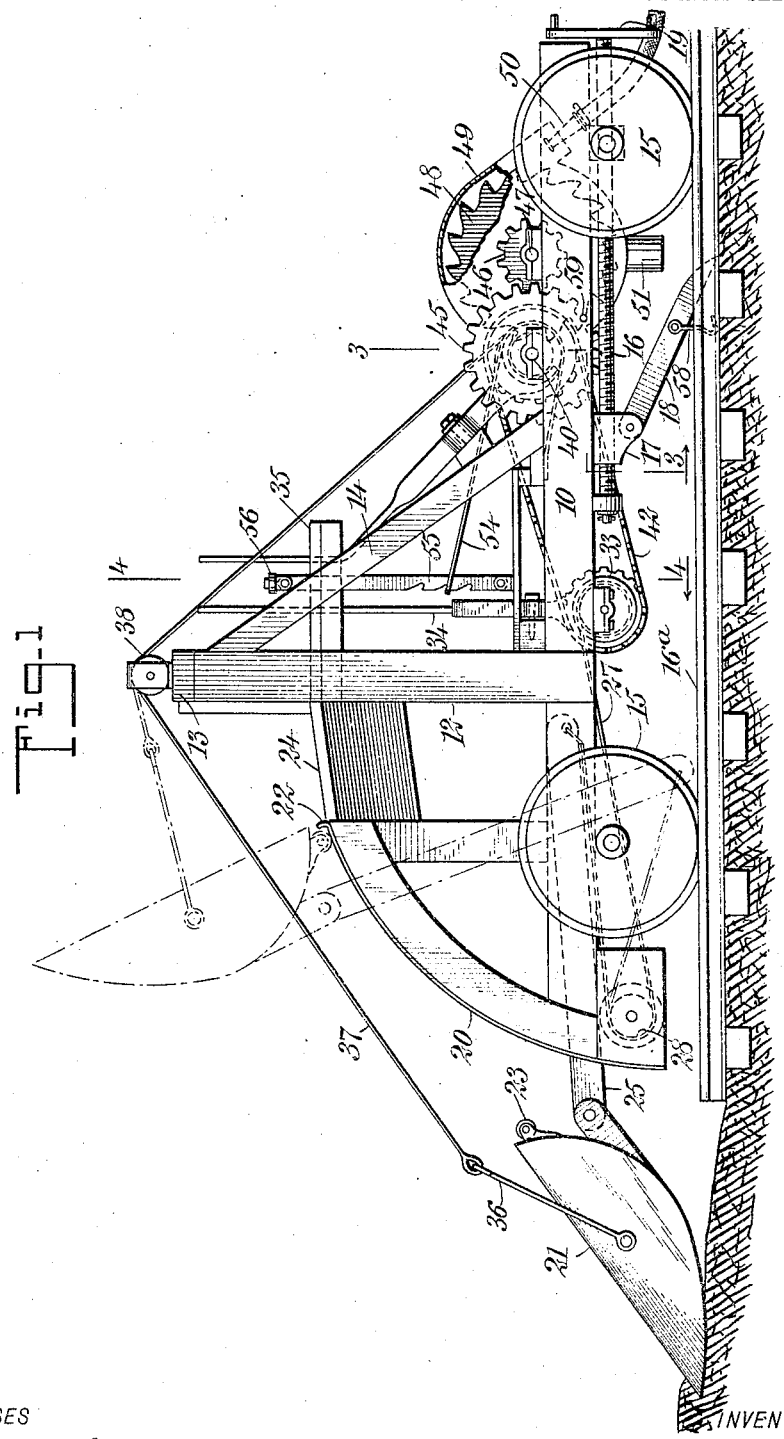
WITNESSES
J. H. Brophy
C. R. Ferguson
INVENTOR
Robert Belden
BY Munn & Co
ATTORNEYS

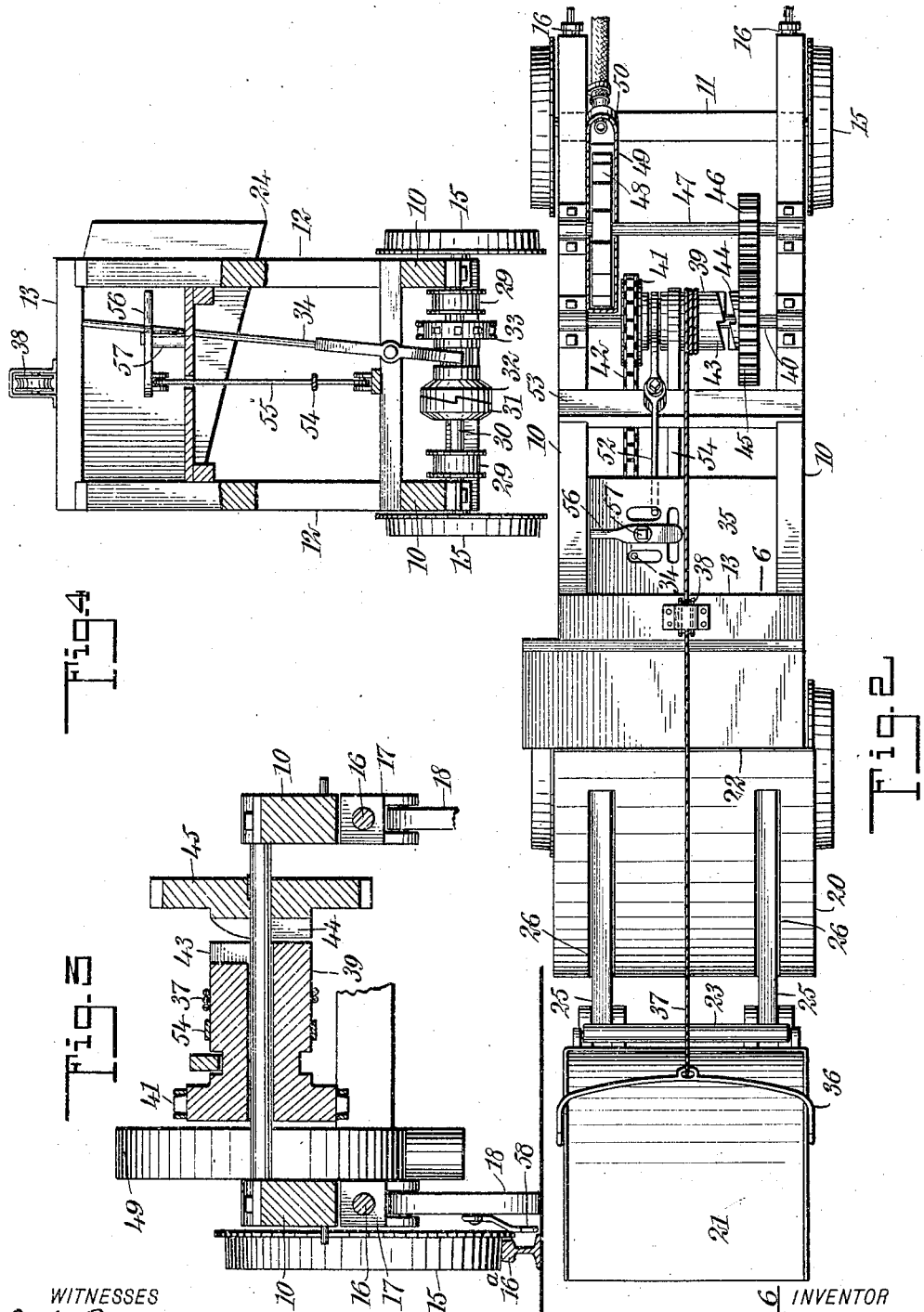

No. 856,018.
PATENTED JUNE 4, 1907.
R. BELDEN.
POWER SHOVEL.
APPLICATION FILED NOV. 20, 1906.
3 SHEETS—SHEET 3.
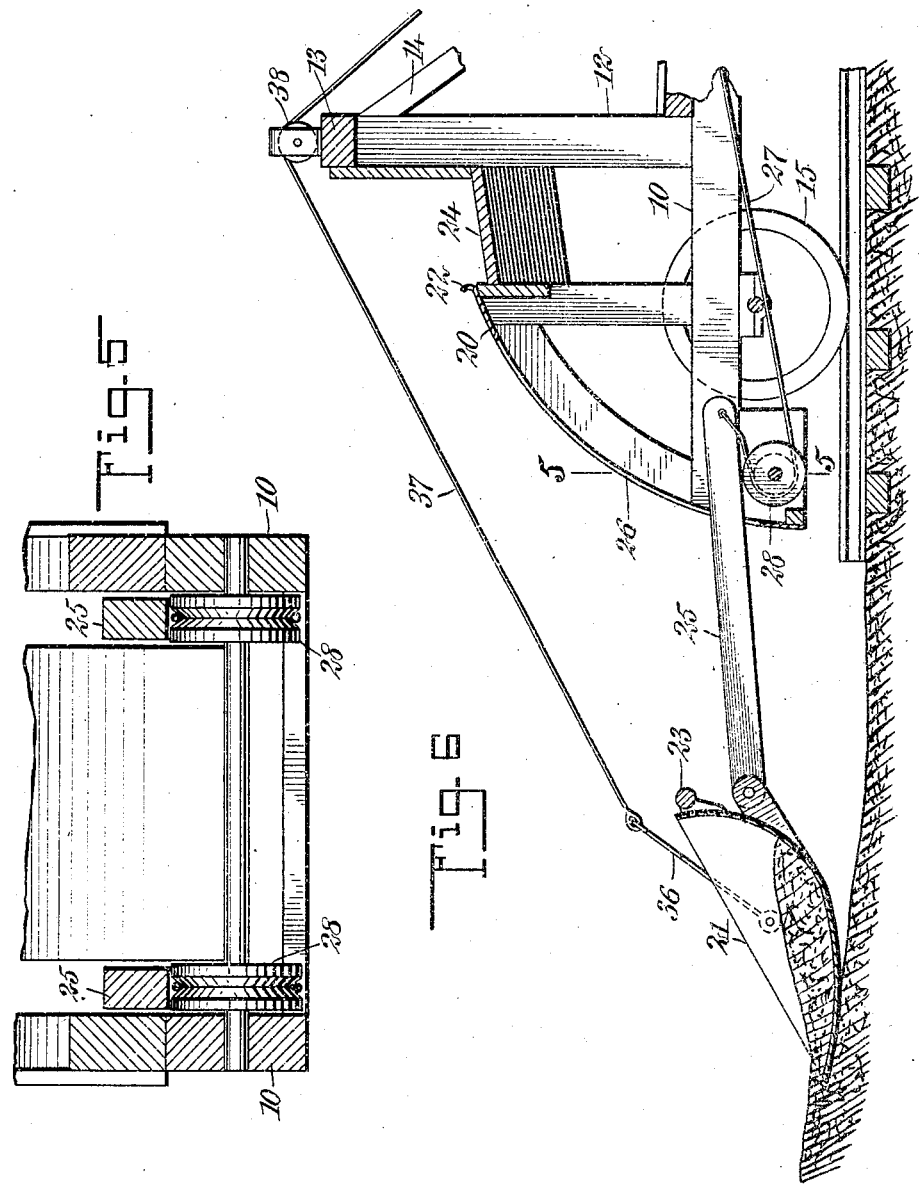
WITNESSES
INVENTOR
Robert Belden
BY
ATTORNEYS

UNITED STATES PATENT OFFICE.

ROBERT BELDEN, OF SPANISH RANCH, CALIFORNIA.

POWER-SHOVEL.

No. 856,018. Specification of Letters Patent. Patented June 4, 1907.

Application filed November 20, 1906. Serial No. 344,252.

*To all whom it may concern:*

Be it known that I, ROBERT BELDEN, a citizen of the United States, and a resident of Spanish Ranch, in the county of Plumas and State of California, have invented a new and Improved Power-Shovel, of which the following is a full, clear, and exact description.

This invention relates to improvements in power shovels for digging railroad beds, ores, ditches, and the like, the object being to provide a power shovel of comparatively simple construction by means of which the work may be rapidly carried on.

I will describe a power shovel embodying my invention and then point out the novel features in the appended claims.

Reference is to be had to the accompanying drawings forming a part of this specification, in which similar characters of reference indicate corresponding parts in all the figures.

Figure 1 is a side elevation of a power shovel embodying my invention; Fig. 2 is a plan thereof; Fig. 3 is a section on the line 3—3 of Fig. 1; Fig. 4 is a section on the line 4—4 of Fig. 1; Fig. 5 is a section on the line 5—5 of Fig. 6; and Fig. 6 is a section on the line 6—6 of Fig. 2.

The main frame of the machine comprises side rails 10 connected at the rear by a cross bar 11, and connected to the side bars of the main frame are uprights 12 attached to the upper ends of which is a cross bar 13 and these uprights are braced to the main frame by the brace bars 14. The device is mounted on wheels 15 which, in certain instances, may run on tracks 16ᵃ.

It is to be understood that when the shovel is in operation, as will be hereinafter described, the carriage is at a standstill, but obviously it must be moved from place to place as the shovel progresses. As a means for moving the carriage forward, I employ screw rods 16 which are mounted in bearings depending from the side rails 10 of the main frame and engage in tapped openings in lugs 17 attached to said side rails, and pivotally connected to the lugs are arms 18 having their lower ends sharpened to engage in the ground, as indicated in Fig. 1. By this arrangement by means of the cranks 19 at the outer ends of the screw rods, rotary movement of the screw rods by operating in the lugs or blocks 17 will move the carriage forward as the ends of the arms 18 engage in the ground. While I have before stated that the lugs or blocks 17 are connected to the side rails 10, it will be understood that they have sliding connection therewith. At the forward end of the machine is an upwardly and rearwardly inclined plate 20 which forms a track upon which the shovel 21 is movable and the upper end of the track has an upwardly extended flange 22 serving as a stop with which a roller 23, carried by the shovel, is designed to engage to tilt said shovel when in its uppermost position, as indicated by dotted lines in Fig. 1, thus dumping the load into a laterally and downwardly inclined chute 24 for conducting the material to the side of a trench or discharging the same on a car or other vehicle. Having pivotal connection with the shovel 21 at its opposite sides are shifting arms 25. These arms 25 pass through slots 26 in the plate 20 and from the inner ends of said arms 25 cables 27 extend around rollers 28 in the forward portion of the machine and thence rearward to connection with drums 29 mounted on a shaft 30 having loose bearings in boxings attached to the side rails 10. Secured to the shaft 30 is a clutch member 31 adapted to be engaged by a clutch member 32 movable lengthwise of the shaft 30 and carrying a sprocket wheel 33, and this clutch member 32 is provided in its hub portion with an annular channel for receiving the forked end of an operating lever 34 which extends upward through an opening in a platform 35 on which the operator of the machine is to stand.

From the bail 36 of the shovel a cable 37 extends upward over a pulley 38 mounted on the cross bar 13 and thence downward to a drum 39 loosely mounted on a shaft 40, and attached to the shaft 40 is a sprocket wheel 41 from which a chain 42 passes to driving connection with the sprocket wheel 33. The drum 39 has a clutch member 43 designed for connection with a clutch member 44 rigidly attached to the shaft 40, and also rigidly attached to said shaft 40 is a gear wheel 45 meshing with a pinion 46 on a driving shaft 47 and to this driving shaft the motor is connected. As here shown, this motor is in the form of a hydraulic motor; that is, it comprises a turbine 48 mounted on the shaft 47 and arranged within a casing 49, water being discharged against the wheel through a nozzle 50 leading into the casing, and the water may be discharged through an outlet pipe 51.

The drum 39 carrying the clutch member is moved lengthwise of the shaft 40 by means of a lever 52 pivoted to a cross bar 53 attached to the main frame and having a forked end for engaging in a channel formed in the drum. The said shifting lever 52 passes upward through an opening in the platform 35, as clearly illustrated in Figs. 1 and 2.

To prevent the shovel from moving too rapidly downward after dumping and therefore preventing forcible striking on the ground, I provide a brake mechanism, here shown as a strap 54, which passes around the drum 39 and is connected with the cross bar 53, and at the other end it has adjustable connection with a brake lever 55, the said brake lever passing upward through an opening in the platform 35, the upper end of said brake lever being pivotally connected to a horizontally disposed actuating lever 56 pivoted on a stud 57 on said platform. By arranging the lever 56 in horizontal position it may be straddled by an operator standing on the platform so as to be conveniently operated by the operator's legs.

In operation when the shovel is in its lower position, the clutch of the drum 39 is to be moved out of engagement with the clutch member 44, while the clutch members 31 and 32 are to be moved into engagement. When the parts are in such position, the motor will cause rotary movement of the drums 29, and through the drum of the cables 27 and the arms 25, the shovel will be moved forward to scoop up the dirt and of course, at this time the cable 37 will unwind on its drum. When the shovel is filled the clutch members 31 and 32 are to be detached and the clutch members 43 and 44 moved into engagement, so that the shaft 40 will be rotated, consequently rotating the drum 39 and raising the shovel to dumping position. As before stated, the speed of downward movement and the contact of the shovel with the ground may be regulated by the brake strap 54.

When the machine is not in use the arms 18 may be swung upward and hooks 58 on said arms engaged with pins 59 on the side rails of the main frame.

Having thus described my invention, I claim as new and desire to secure by Letters Patent:

1. In a power shovel, a wheel-mounted frame, a shovel carried by the frame, a motor on the frame, means actuated by said motor for moving the shovel forward, and means actuated by the motor for swinging the shovel upward a track on the frame for guiding the shovel in its upward movement, and means at the end of the track for dumping the shovel.

2. In a power shovel, a wheel-mounted frame, a curved track at the forward end of the frame, a pair of drums mounted in the frame, arms having pivotal connection with the shovel, rollers at the forward end of the frame, cables extending from the inner ends of said arms around said pulleys to said drums, a motor on the frame for operating said drums, and means actuated from the motor for swinging the shovel upward over said curved track.

3. In a power shovel, a wheel-mounted frame, a curved track at the forward end of the frame and having a stop at its upper end, a shovel, a roller carried by said shovel for engaging with said track and with said stop, means for moving the shovel upward on said track, and means for moving the shovel forward with relation to the track when in lowered position.

4. In a power shovel, a wheel-mounted frame, standards on said frame, a curved track at the forward end of the frame and having slots, a shovel, arms extended from the shovel through said slots of the track, winding drums mounted in the frame, rollers at the forward end of the frame, cables connected at one end of said arms and extended around said rollers to connection with the drums, a shovel lifting drum mounted in the frame, a cable extended from the lifting drum over said standards to connection with the shovel, and a motor carried by the frame for operating the drums.

5. In a power shovel, a wheel-mounted frame, a curved track at the forward end of the frame, a laterally extended and downwardly inclined chute at the upper end of the track, a shovel, means for moving the shovel along the track, means for tilting the shovel at the upper end of the track, and means for causing forward movement of the shovel relatively to the track.

6. In a power shovel, a wheel-mounted frame, uprights on said frame, an upwardly and rearwardly curved plate-like track at the forward end of the frame and having slots, arms movable in said slots, a shovel having swinging connection with the arms, a drum mounted in the frame, a shaft on which the drum is loosely mounted, a clutch mechanism for engaging the drum with the shaft, a motor on the frame for driving said shaft, a cable connection extended from said drum over the upright and connected with the shovel, a pair of drums forward of the first-named drum, cable connections between said pair of drums and said arms, a shaft on which said pair of drums is mounted, a clutch member on said last-named shaft, a clutch member movable on said last-named shaft for engaging with the first-named clutch member, driving connections between the two shafts, and a motor for operating the shafts.

7. In a power shovel, a wheel-mounted frame, a winding drum carried by the frame, a motor on the frame for operating said drum in one direction, a vertically swinging shovel carried by the frame, a cable connection between the shovel and said drum, and a brake having connection with the drum.

8. A power shovel, comprising a wheel-mounted frame, a hydraulic motor mounted on the frame, a shovel having vertical swinging movement with relation to the frame and also having horizontal movement with relation to the frame, means operated by the motor for causing the upward swinging movement of the shovel, and means operated by the motor for causing the forward movement of the shovel a track at the front of the frame for guiding the shovel, and dumping means for the shovel in connection with the track.

In testimony whereof I have signed my name to this specification in the presence of two subscribing witnesses.

ROBERT BELDEN.

Witnesses:
W. M. RICHARDS,
G. H. BACHER.